(12) United States Patent
Liu (10) Patent No.: US 12,477,043 B1
(45) Date of Patent: Nov. 18, 2025

(54) INTELLIGENT CALL HANDLING AND ROUTING

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 32 days.

(21) Appl. No.: 18/132,010

(22) Filed: Apr. 7, 2023

Related U.S. Application Data (63) Continuation of application No. 17/102,004, filed on Nov. 23, 2020, now Pat. No. 11,647,087, which is a continuation of application No. 16/230,357, filed on Dec. 21, 2018, now Pat. No. 10,848,617, which is a continuation of application No. 15/377,825, filed on Dec. 13, 2016, now Pat. No. 10,165,114, which is a continuation-in-part of application No. 15/240,391, filed on Aug. 18, 2016, now Pat. No. 10,404,759, and
(Continued)

(51) Int. Cl.
| | |
|---|---|
| H04L 67/30 | (2022.01) |
| H04L 65/1069 | (2022.01) |
| H04L 67/02 | (2022.01) |
| H04L 67/306 | (2022.01) |
| H04M 3/42 | (2006.01) |
| H04M 3/436 | (2006.01) |
| H04M 3/51 | (2006.01) |
| H04M 7/00 | (2006.01) |

(Continued)

(52) U.S. Cl.
CPC ........ *H04L 67/306* (2013.01); *H04L 65/1069* (2013.01); *H04L 67/02* (2013.01); *H04M 3/42017* (2013.01); *H04M 3/42323* (2013.01); *H04M 3/436* (2013.01); *H04M 3/5108* (2013.01); *H04M 7/006* (2013.01); *H04L 65/1076* (2013.01); *H04L 65/1104* (2022.05); *H04M 3/42059* (2013.01)

(58) Field of Classification Search
CPC ... H04L 67/306; H04L 65/1069; H04L 67/02; H04L 65/1076; H04L 65/1104; H04M 3/42017; H04M 3/42323; H04M 3/436; H04M 3/5108; H04M 7/006; H04M 3/42059
See application file for complete search history.

(56) References Cited

U.S. PATENT DOCUMENTS

| | | |
|---|---|---|
| 6,920,441 B2 | 7/2005 | Zyarko et al. |
| 6,922,411 B1 | 7/2005 | Taylor |
| (Continued) | | |

OTHER PUBLICATIONS

USPTO Notice of Allowance dated Jun. 23, 2023, received for U.S. Appl. No. 17/878,571 of the Instant Applicant/Assignee, 9 pages.

*Primary Examiner* — Steven Hieu D Nguyen
(74) *Attorney, Agent, or Firm* — Vista IP Law Group, LLP (57) ABSTRACT

Certain aspects of the disclosure are directed to routing decisions implemented in a data-communications system in response to a set of programming instructions from a programming language that is received and/or provided on behalf of a specific subscriber or client and that is different from a programming language more-generally used by the system to provide data-communications to a plurality of subscribers or clients including the specific subscriber or client. According to a specific example, in response to identifying and/or interpreting the second set of instructions, call processing or routing decisions are made in connection with incoming calls involving one or more endpoint devices associated with the specific subscriber or client.

19 Claims, 5 Drawing Sheets

Related U.S. Application Data a continuation-in-part of application No. 15/240,457, filed on Aug. 18, 2016, now Pat. No. 10,135,974.

(60) Provisional application No. 62/353,977, filed on Jun. 23, 2016, provisional application No. 62/353,971, filed on Jun. 23, 2016.

(51) Int. Cl.
*H04L 65/1076* (2022.01)
*H04L 65/1104* (2022.01)

(56) References Cited

U.S. PATENT DOCUMENTS

| | | | |
|---|---|---|---|
| 6,985,478 B2 | 1/2006 | Pogossiants et al. | |
| 7,653,191 B1 * | 1/2010 | Glasser | H04M 3/42229 379/212.01 |
| 8,018,921 B2 | 9/2011 | Pogossiants et al. | |
| 9,553,755 B2 | 1/2017 | Anisimov et al. | |
| 2003/0194078 A1 * | 10/2003 | Wood | H04L 65/1046 370/352 |
| 2005/0220288 A1 * | 10/2005 | Huey | H04M 3/5237 379/221.01 |
| 2007/0003050 A1 * | 1/2007 | Ebling | H04M 3/523 379/101.01 |
| 2007/0092073 A1 * | 4/2007 | Olshansky | H04M 3/546 379/232 |
| 2008/0222616 A1 * | 9/2008 | Cheng | G06F 8/51 717/137 |
| 2010/0306277 A1 * | 12/2010 | Rimer | G06F 16/80 707/802 |
| 2012/0047494 A1 * | 2/2012 | Unrein | G06F 9/44521 717/136 |
| 2016/0277587 A1 * | 9/2016 | Alexander | H04M 3/46 |

* cited by examiner

INTELLIGENT CALL HANDLING AND ROUTING

OVERVIEW

Aspects of various embodiments are directed to communication and computing services. Voice over Internet Protocol (VOIP) and other telecommunication platforms have allowed individuals to make telephone calls using broadband Internet connections in place of traditional telephone lines. A VoIP endpoint device can use a broadband Internet connection to connect to a VoIP server that is managed by a VoIP service provider. The VoIP server can handle call routing and provide other VoIP services for the VoIP endpoint device.

Computer servers are increasingly being used to provide various services over a network including, but not limited to, VoIP communication services such as VoIP calls, video conferencing, call exchange servers, packet switching, and traffic management as well as non-VOIP services including, but not limited to: website hosting, remote data storage, remote computing services, and virtual computing environments.

The use of VoIP telecommunications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the telecommunications users.

For business entities, the increased use of VoIP telecommunications services has been particularly complex, largely due to providing the same level of personal features to users from the vantage point of each business entity's telecommunications platform. As examples, a VOIP telecommunications service provider such as 8×8, Inc. can be providing such VoIP services to a multitude of business entities each of which uses the provided services for a customized platform configured to provide telecommunications services to a wide range of employees. For each such customized platform, it can be particularly burdensome for the VoIP telecommunications service provider to adjust and reconfigure the customized platform (of each respective business entity to which such services are being provided) each time a business entity (e.g., as requested by the entity's IT department, employee(s) or changes in terms of the employee's communications equipment/endpoint devices.

SUMMARY

Various example embodiments are directed to issues such as those addressed above and/or others which may become apparent from the following disclosure concerning systems and methods for using VoIP call control for customizable and readily configurable incoming call routing and/or related telecommunications services.

Embodiments are directed toward methods for use in telecommunications systems employing a VoIP server operated by a telecommunications provider. In such systems, the VOIP server includes one or more computer processor circuits (configured with access to databases stored in memory circuits) and configured to act as a telecommunications call-control engine for routing, processing calls and/or providing related telecommunications services on behalf of client entities. Such client entities may be exemplified respectively as the above-noted businesses with employees ranging in number from just a few to thousands, and being located/mobile for communications services in any of a multitude of venues. In these embodiments, such methods use the call-control engine to provide such telecommunications services by: receiving VoIP telephone calls from VOIP endpoint devices; identifying, in response to the VoIP telephone calls, a first set of one or more documents (e.g., providing directives or commands with call processing data) written in a first instruction-configurable/programmable language that is associated with a message exchange protocol that is used between the VoIP call routing server and data sources. Examples of such documents may also include other forms of code providing data and/or instructions over an interface facilitating communication between the telecommunications provider and the VoIP endpoint devices. Such methods execute the first set of documents to make decisions on how to route calls placed by the VoIP endpoint devices, and to identify a second set of one or more documents (written in a second instruction-configurable/programmable language) associated with the routing decisions. The first and second programmable languages may be similar, in that both languages are derivatives of a same type of programmable language, but the first and second programmable languages may differ in terms of content and use. The first programmable language may identify call processing directives provided to the telecommunications provider by the client entity, whereas the second programmable language may identify call routing directives as provided by the telecommunications provider. Such methods execute the second set of documents to retrieve data from the data sources maintained by the telecommunications provider, and provide, in response to the data, call control functionality for the VOIP calls placed by the endpoint device.

Certain embodiments are directed toward a VoIP server operated by a VoIP provider and comprising: one or more computer processor circuits coupled to memory circuits and configured to provide a call control engine that is configured to: receive VoIP telephone calls from VoIP endpoint devices; identify, in response to the VoIP telephone calls, a first set of one or more documents written in a first programming language that defines a message exchange protocol between the VoIP call routing server and data sources; and execute the first set of documents to: make routing decisions for the VoIP calls; and identify a second set of one or more documents associated with the routing decisions; and execute the second set of documents to: retrieve data from the data sources; and provide, in response to the data, call control functionality for the VOIP calls.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving routing incoming calls relative to a receptionist. In certain implementations, aspects of the present disclosure have been shown to be beneficial when used in the context of providing VoIP communications services. While the present disclosure is not necessarily limited to such VoIP communications systems as described herein, for purposes of facilitating understanding and appreciation of certain embodiments, the following discussion uses such VoIP-based services and systems in the context and on behalf of telecommunications platforms of client entities which subscribe to such services from a VoIP telecommunications service provider (with a server).

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to VoIP communication servers configured to provide VoIP communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Some telecommunications service providers customize their services for different customers. This approach might include customizable auto attendants, call routing, call forwarding, voicemail, among other available features. For particularly large clients with many different telephone accounts and numbers, implementing and updating these types of customizations can require be a significant undertaking. Certain embodiments of the present disclosure are directed to an interface that allows a client-specific control engine to access and dynamically adjust the manner in which services are provided for the users of a client account, while maintaining the integrity and security of the underlying system providing the services.

According to certain embodiments, a VoIP communication system may be configured to allow a client-specific control engine to dynamically modify and control the call flow and processing at different levels within the system, including (re) routing of incoming calls generally and by way of private branch exchanges (PBXs) and Internet Protocol PBXs (or IP PBXs) to provide intelligent routing relative to receptionists and direct dial numbers for individuals using the IP PBXs. Rules of various complexity can be used for routing incoming calls, whether to one or more receptionists, directly to extensions, to voicemail, or for other call routing purposes. The logic used for the routing decisions can be based upon directives and related data shared across multiple PBXs, data that can be dynamically changed, and upon rules and logic that can be defined according to multiple tiers of call routing decisions. For example, a large company may have many different office or store locations. Portions of the call routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating, particularly in situations where there are many thousands of extension rules can be a difficult proposition.

According to certain embodiments, the VoIP communication system provides inbound and outbound call routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to certain example embodiments, a VoIP system is configured as a Platform as a Service (PaaS) that provides a user with access to, among other things, telephone call routing control, PBX functions, computer telephony integration (CTI), and data analytics (in this context the user can refer to, e.g., person, group, server or CPU, or subscribing business entity). Embodiments of the present disclosure are directed toward an interface that allows users of the PaaS solution to access VoIP telephone capabilities of the underlying system, including its hardware and software components, while maintaining the integrity and security of the underlying system. Particular embodiments are directed toward a PaaS solution that allows for VoIP call flow control to be controlled, while also providing the ability to interface with data sources that are either part of the underlying system or external to the PaaS solution. These features can be used in combination with a call routing that can be configured and adjusted in a scalable manner.

The ability to access the underlying VOIP services, including call routing and call control engines, can provide a platform that is both flexible and simple to implement from the viewpoints of both the VoIP provider and the customers of the VOIP provider. The PaaS solution can be configured to modify and control the call flow and processing at all levels within the system, including (re) routing of incoming calls to different PBXs. When compared to an add-on type service where a call is first handled by a separate PBX, the PaaS solution may offer a number of advantages and additional features including, but not limited to, increased call routing capabilities, scalability, and reduced complexity. For instance, access to PBX functions allows for simple call redirection to extensions or DID numbers provided by the PBX. Moreover, the PaaS solution coordinates and routes calls between multiple PBXs using an initial call routing switch. Calls initially routed to a particular PBX can still be rerouted to a different PBX using the initial call routing switch.

The VOIP servers providing the underlying function for the PaaS can be configured to utilize a programmable (or configurable) communication protocol such as a high-level, domain-specific programming language as might be implemented with respective VoIP servers providing VoIP call routing and IP PBX functions on respective sides of an interface configured to facilitate the communications via the defined protocol. A particular example of a VoIP server may use session initiation protocol (SIP) to handle various call functions (e.g., call setup and tear down). However, the various embodiments discussed herein are not necessarily limited thereto. Consistent with the above and in other embodiments disclosed herein, the VoIP servers can be configured to establish a leg of the call from the VoIP endpoint devices (or dial peers) to another VoIP endpoint device or to endpoints on the PSTN through use of a VOIP-PSTN gateway.

According to more specific example embodiments, a high-level domain-specific programmable communication protocol uses one or more languages which are defined using a markup language as the basis for the language structure. Particular implementations relate to the use of at least two domain-specific languages, one that can be used for initial call routing and the other for providing more complex and specific call processing functions. More particular example embodiments use an extensible Markup Language (XML). An XML model defines the constraints on the high-level language, including defining the set of valid commands that can be carried out by the VOIP servers. Within these constraints, a customer can write XML code that self-describes the building blocks used in the customer's particular application. XML also allows for various different data structures to be embedded into the XML document or file. For example, a script written in JavaScript can be embedded as character data that the VOIP servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as XML derivative languages or XML-type languages.

Various examples of such XML derivative languages are exemplified in U.S. patent application Ser. No. 15/377,778 (U.S. Pat. No. 10,057,412) and Ser. No. 15/377,797 (U.S. Pat. No. 10,122,682) filed on Dec. 13, 2016, and entitled "Region-based connecting of calls using client-specific control and provisioned numbers" and "Region-based bridging of calls using client-specific control and revised caller identifiers" (respectively) which are fully incorporated by reference herein. In certain example VoIP applications, two XML-type languages are implemented as a call processing XML and a call routing XML, respectively as XML derivative languages corresponding to XML but customized for processing VoIP calls on the side of the interface operating on behalf of customer entities and on the other side of the interface for higher level processing (including, for example, call routing) by the VoIP service provider. For further application-specific examples of such XML-type customization, reference may be made to discussion of CPXML and CRXML as disclosed in U.S. patent application Ser. No. 15/377,778 (U.S. Pat. No. 10,057,412) and Ser. No. 15/377,797 (U.S. Pat. No. 10,122,682). Such XML derivative languages can be written specific to types of functionality as needed for various customer entities, thereby allowing developers to program call processing logic or service execution logic with both XML building blocks and JavaScript/TCL, or other scripting languages best suited to levels (e.g., in terms of quantity range of a customer's endpoint devices and/or in terms of complexity of the VoIP-based media functionality and evolving demands expected by a customer). In certain implementations, XML derivative languages allow PaaS customer developers to program and integrate VoIP call flow (e.g., as provided by a cloud-based VoIP service) with customer or third party application servers and databases. In particular, the call flow can include a connection that is used as part of call routing decisions and call processing options that are related to one or more receptionists that can answer calls to a group of endpoint devices. The system allows different levels of call control logic to be implemented in a manner that can facilitate scalability of the system of large organizations with many endpoint devices and with complex organizational structures that have corresponding complex call routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related telecommunications data can be provided in documents corresponding to other languages and/or communications protocols; for example, one such programming language can be used for initial call routing and another programming language can be used for providing more complex and specific call processing functions. For more general information regarding implementation and control relating to such client-directed telecommunications services (and more specifically interface/communications implementations), reference may be made to U.S. Patent Application Ser. No. 62/353,971 filed on Jun. 23, 2016, and entitled "Client-Specific Control of Shared Telecommunications Services", U.S. patent application Ser. No. 15/240,391 filed Aug. 18, 2016, and entitled "Client-Specific Control of Shared Telecommunications Services", U.S. Patent Application Ser. No. 62/353,977 filed Jun. 23, 2016, and entitled "Client-Specific Control of Shared Telecommunications Services", and U.S. patent application Ser. No. 15/240,457 (U.S. Pat. No. 10,135,974) filed on Aug. 18, 2016, and entitled "Client-Specific Control of Shared Telecommunications Services", which are fully incorporated by reference herein. As discussed above, instead of or in combination with such XML-type languages, these other implementations may be realized as being suitable for serving telecommunications with different size and/or complexity metrics as needed to provide adequate telecommunications service to customer entities.

According to particular embodiments, an XML engine can respond to a call, or other event, by sending requests to a web server and get XML derivative documents for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, call control, and flow control logic. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the VoIP server provider's cloud database). This information can then be used to drive call flow or call control functionality and decisions.

As applicable to routing decisions relating to receptionists, an incoming call can be processed according to an XML document with instructions for determining whether calls route to a receptionist, directly to a called endpoint device, or are routed and processed in some other manner. As an example, the XML document could include a set of global rules for determining how to handle calls to endpoints of a customer (e.g., a large business with many individuals and corresponding endpoint devices). XML documents can specify local rules for routing calls (e.g., to endpoint devices, voicemail, auto call attendants), or otherwise processing the call. The local rules might be used if global rules specify that the call is not routed to a receptionist, or if the receptionist rejects or forwards the call on. Each of the local and global rules can be driven, at least in part, by data retrieved from a data source, such as a client server or database. As an example, the global rules could access a customer database that includes lists of caller IDs that are handled differently. The call routing VoIP server does not need to have direct access to the lists of caller IDs (which might be confidential lists and thereby represent a security risk if shared directly with the VoIP server). Rather, the VoIP server can send a query that includes a specific caller ID number of an incoming call. In response to the query, information can be provided that indicates how to process the call (e.g., whether to route the incoming call to a receptionist or directly to the dialed endpoint device).

According to various embodiments, the high-level programming language allows a programmer access to the PaaS solution by way of a controlled and limited set of call control functionality in the form of call processing and routing operations. The limitations on the operations can be particularly useful for allowing programming control to be placed into the hands of different customers of the provider of the VoIP servers. For example, the provider can update or make other changes to how the VoIP servers are configured without requiring modification to documents written to use the high-level language, which might otherwise be required to account for the changes. Moreover, the VoIP servers and their data can be protected from poor programming decisions (intentional or otherwise) by tightly controlling the extent that the documents provide control of, or access to, the inner workings of the VoIP servers.

In various embodiments, the high-level programming language and the VoIP servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

In an example embodiments, a communication system includes a one or more VoIP communication servers configured to provide VoIP communications for endpoint devices of a plurality of client accounts. Endpoint devices connected as part of a particular call can include VoIP-enabled devices (e.g., IP phones, smart phones, tablets, and/or desktop computers with appropriate VoIP software applications) and/or non-VoIP endpoint devices (e.g., plain old telephone service (POTS) telephones and cellular-capable devices). A respective client can have an account that is associated with one or more endpoint devices. Endpoint devices may be associated with a particular client account by registering the endpoint device with a particular client account serviced by the VoIP communication server(s). Registered devices for each client account may be specified in a respective account settings file accessible by the VoIP communication server(s).

In some embodiments, the VOIP communication server(s) may provide VoIP services using various processes and circuits. As one example, the VOIP communication server(s) may provide VoIP services that are response to XML documents for each respective client. The XML documents can, for example, be provided with a request to establish communications with an individual (e.g., through a telephone call or a text message).

According to various embodiments, the high-level, domain-specific programming language(s) are defined using a markup language as the basis for the language structure. More particular embodiments use an XML model that defines the constraints on the high-level language, including defining the set of valid commands that can be carried out by the VoIP servers. Unless otherwise stated, the use of XML in connection with various embodiments does not necessarily limit the corresponding embodiments, such as limiting the embodiments to the use of only an XML-based language(s).

Within the system's constraints, a customer can write XML code that self-describes the building blocks used in the customer's particular application. A particular aspect of the call processing XML is that an API can be used to embed XML into communication requests. For example, a representational state transfer-(RESTful) based application program interface (API) may allow clients to initiate calls by generating links (e.g., specifying a URI) and generating hypertext transfer protocol (HTTP) commands for the links (e.g., GET, POST, or PUT). The XML can be embedded in the link so that the XML is provided as part of the HTTP request generated when accessing the link (e.g., in response to selection from within a web browser). The XML is then used by the call control engine when making the requested telephone calls. In particular instances, the XML can be used to communicate information, such as time-of-day routing rules, that is then used as part of routing decision on whether to route calls to a receptionist.

Figure 1:
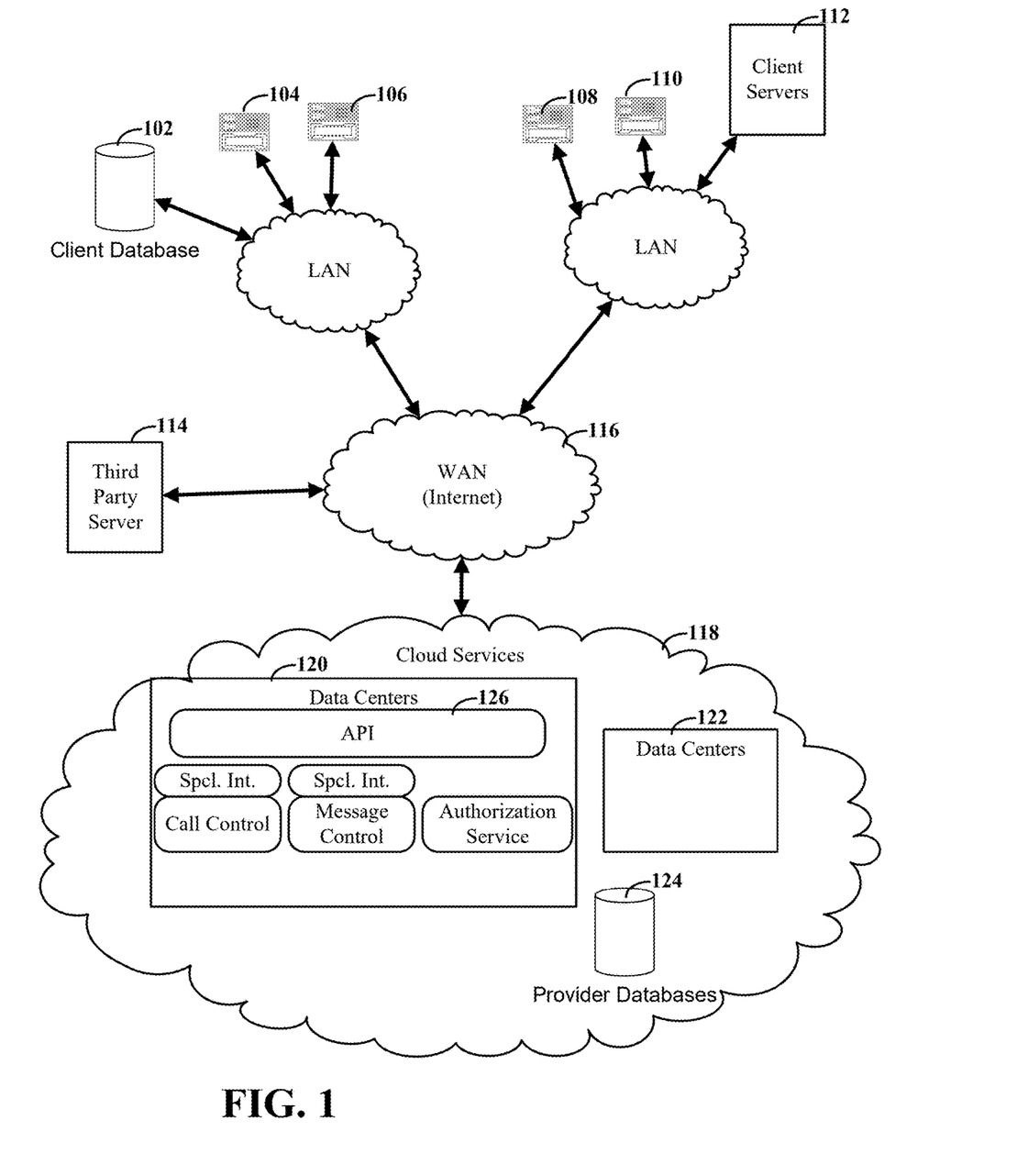
FIG. 1 is a diagram for a VoIP-capable system that uses a high-level programming language for call control functionality and operations, consistent with embodiments of the present disclosure.

Turning now to the figures, FIG. 1 is a diagram for a VoIP-capable system that uses a high-level programming language for call control functionality and operations, consistent with embodiments of the present disclosure. In connection with these specifically-illustrated examples, VOIP endpoint devices 104, 106, 108, and 110 are configured to place and receive VoIP telephone calls between other VoIP endpoint devices, and also between non-VoIP endpoint devices. Examples of non-VOIP endpoint devices include plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts, a VoIP-endpoint device is a VoIP-capable telephone, commonly referred to as an IP phone. The VoIP-endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer.

The call routing and other services for the VoIP telephone calls can be provided by one or more VOIP servers within the cloud-based system 118 (e.g., configured to provide a PaaS to customers of the VoIP provider). In particular example embodiments, the VoIP servers can be located within one or more data centers 120, 122, which are part of a cloud services system 118. The data centers can be, for example, part of a cloud-based system 118 where the hardware providing the cloud services is located in a number of different data centers with different physical locations. Consistent with embodiments, the cloud services can include services provided by SIP servers, media servers, authorization servers, call control servers, and servers providing other services to both VOIP endpoint devices and the users of the VOIP endpoint devices. In some instances, the various servers, including both the VOIP Servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a VoIP server uses session initiation protocol (SIP) to handle various call functions (e.g., call setup and tear down); however, the various embodiments discussed herein are not necessarily limited thereto. Consistent with the above and other embodiments disclosed herein, the VoIP servers can be configured to establish a leg of the call from the VoIP endpoint devices (or dial peers) to another VoIP endpoint device, or to a gateway.

Certain embodiments are directed toward an API server 126 that is configured to allow clients to create webpages or other software that can initiate communications with endpoint devices in response to requests received over the Internet 116. In particular embodiments, the API server 126 operates as a RESTful API that allows clients to generate URI links specifying parameters for a desired communication, such as content for use with generating outgoing calls from selections made through a web interface. For instance, a client server 112 can be configured to use the API to generate a URI link that can be displayed to an end user. The URI link can contain information that identifies an endpoint device and how the endpoint device is to be contacted (e.g., by telephone call or text message). The API generated URI link sends a communication request to the appropriate service within the data center. For example, the URI link can result in a communication with a call control server in order to initiate a telephone call to an endpoint device or a text message to an endpoint device.

According to various embodiments, one or more data analytics servers can monitor and analyze call data relating to the VoIP servers and VoIP endpoint devices. For example, a data analytics server may track call statistics about various different call-related parameters, such as: call duration, call date, call time of day, called parties, endpoint devices, selected data centers, selected carriers, dropped calls, transferred calls, voicemail access, conferencing features, and others. The XML can request access to the call summary metrics and the data analytics, which can be stored in a provider database 124. For example, a script running the VoIP server could parse XML derivative (control data) documents to generate database queries that direct the VoIP server to query, or subscribe to, call length summaries for all calls made to endpoints that are registered with the VoIP server. The script could then use the information to control how calls are routed as well as how different (customer or provider) services are invoked. According to various embodiments, the database queries could be sent to a client or customer database 102.

Consistent with certain embodiments, the VoIP server can be configured to interface with client servers 112 or even with third party servers 114. For instance, a XML derivative document stored by the cloud-based system 118 can identify, based upon a received call, a URI that points to client servers 112 or to a third party server 114. Data provided from these servers, e.g., in the form of a XML derivative document can be used to specify call routing, or other functions. In the context of call routing to receptionists, the XML derivative document can include a URI that points to a secure server that provides information for making a routing decision. The call control server can then make a call routing decision based upon the information. This can add a layer of security because the VoIP server does not directly access the client information.

According to embodiments, the XML derivative documents can be dynamically constructed using data that is confidential to the client and therefore not shared with the service provider. As an example, the client server may have access to personal information about the individuals calling into the system (e.g., based upon their caller ID). This personal information might be part of caller profiles that identify endpoint devices associated with the callers, caller buying history, or a geographic location of the caller. The client server can use the information to customize the XML documents for each caller. For example, a particular caller might be identified as having a prior relationship with the called party, an XML document could be generated that includes instructions to route the call directly to the called party. The XML document could include additional rules, such as the generation of additional notifications (text message, instant message, email) to the called party if the call is not immediately answered. The ability to customize the XML derivative documents based upon data accessible by the client server allows for the call control functionality and related decisions to be decoupled from the data used to make the decisions. In particular, the service provider can carry out the call control decisions specified in the XML derivative documents without knowledge of the data used to make the decisions.

According to embodiments of the present disclosure, the client server creates XML derivative documents that specify queries to databases managed by the service provider. In particular implementations, the databases can contain information that is proprietary to the service provider and therefore not directly shared with the client. For example, a XML derivative document can use a conditional statement that is premised upon the results of a database query to a database maintained by the service provider. The service provider can implement the query within their system and without the client having access to the data or even the result. The result of the query can be used to determine the appropriate action, as specified in relation to the conditional statement. A conditional statement within the XML derivative document can use the result of a query to a database or other data source as the conditional operator. An example functionality for conditional statement is: if a current call is from a caller ID associated with telemarketing (SPAM calls), then the call should be routed to a receptionist, else the default condition is to directly route the call to the called endpoint device. Using a query in the conditional statement, the service provider can keep the list of SPAM IDs as proprietary data, while still allowing a customer to indirectly use the information.

The provided examples are not limiting with respect to the possible uses of (XML) documents in the context of call routing to receptionist. Additional features and configurations are contemplated and supported by the XML interfaces and the call control engines.

Figure 2:
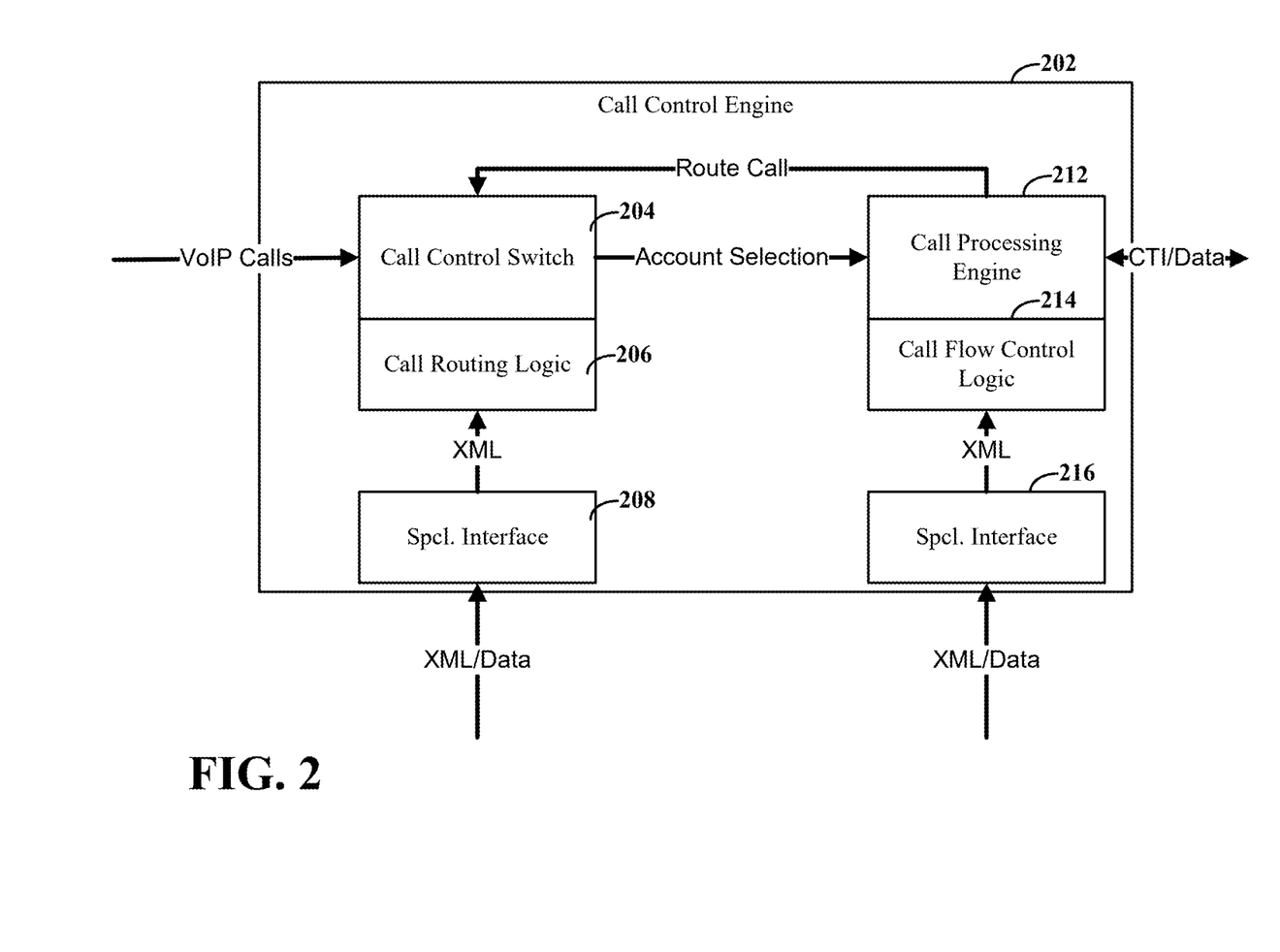
FIG. 2 is a block diagram of a call control engine with high-level programmable language logic for two different languages, consistent with embodiments of the present disclosure.

FIG. 2 is a block diagram of a call control engine with high-level programmable language logic for two different languages, consistent with embodiments of the present disclosure. When an incoming call is received by the call control engine 202, the call can first be handled by a call control switch 204. The call control switch 204 can be configured to receive and process a first document that defines how the call is subsequently routed. As discussed herein, this document can be written in a first programming language, such as a first XML derivative language, which provides limited access to the call routing control logic of the call control switch 204. First XML derivative documents can be provided by a customer through a special interface 208, which provides XML derivative documents to a call routing logic plugin 206. The call routing control logic 206 can parse and execute the first XML derivative documents while providing a controlled access to the functions of the call control switch 204.

According to various embodiments of the present disclosure, the first XML derivative language defines a limited set of commands to the call routing logic that allow a customer to define how a call is initially routed. Maintaining the first XML derivative language as a limited set of simple building block commands can help with the efficiency of the call control switch. For example, the call control switch 204 can be located at the perimeter of the VoIP provider's routing network, which implies that it may be called on to handle a large volume of VoIP telephone calls. The efficiency in processing the large volume of calls can have a significant impact on the performance of the system.

Consistent with various embodiments, the first XML derivative documents specify a first level of call routing and simple call processing that are carried out by the call control switch 204. For example, a call control switch 204 may provide call routing options for multiple branch offices and for multiple iPBXes that support the branch locations. Each branch office and associated iPBX may have multiple customer (user) accounts associated therewith. First XML derivative documents can be used to determine the routing for a call by identifying a particular branch location, a particular iPBX and particular VOIP customer account and iPBX to use in subsequent call processing and routing. The initial routing decision is indicated by the arrow labelled as "account selection," which shows the passage of control to a call processing engine 212.

The call processing engine 212 can be configured to identify and execute additional documents that can be selected based upon the identified account, or upon similar identifying information, as provided by the call control switch 204. As discussed herein, these documents can be written in a second programming language, such as a second XML derivative language, which provides access to the call flow control logic of the call processing engine 212. In certain embodiments, the second programming language, or second XML derivative, can include commands that support contextual call routing and advanced call services. The second XML derivative documents can be provided by a customer using a special interface 216, which provides received second XML derivative documents to a call flow control logic 214. In particular implementations, the interface 216 is configured to allow a customer to upload new XML derivative documents to a database maintained by the VoIP provider. The interface 216 can also be configured to allow XML derivative documents to be retrieved from a customer-managed location. For instance, the customer can provide a base XML derivative document that includes URI to a customer server. The customer server can then provide XML derivative document(s) on an as needed basis for each call. The XML derivative documents could be loaded directly from a customer database, or they might be dynamically generated based upon data that is specific to the particular call (e.g., the called party, the called party status, or the calling party identity), or to data from other inputs (e.g., a call queue status, a status of network outages, or the like).

The call flow control logic 214 can parse and execute the second XML derivative documents while providing controlled access to the functions of the call processing engine 212. According to embodiments of the present disclosure, a second XML derivative document can be associated with a particular extension account (or group of extension accounts) and can be invoked when there is an incoming call routed to the extension account. The call processing engine 212 can determine whether or not the XML derivative option has been enabled for the extension account. If enabled, then the call flow control logic 214 can be called. Consistent with various embodiments of the present disclosure, the call flow control logic 214 and the call routing logic 206 are each implemented as plugin applications that interface with the call control engine according to their respective XML-defined parameters.

In certain embodiments, the call processing engine 212 can have the capability to provide feedback to the call control switch 204. For example, a XML derivative document for a particular account may specify a condition that, if satisfied, routes a call to a different branch office. The call processing engine 212 is configurable, using one or more XML derivative commands, to provide an indication of a new call route decision as feedback to the call control switch 204. The call control switch 204 can respond by overriding the prior call routing decision and rerouting the call. The corresponding routing decision may then go to a different call processing engine 212, which can handle the call according to a different XML derivative document or the previously-used XML derivative document using different data to drive the call processing and routing decisions.

Consistent with various embodiments, outbound calls, or calls originating from VOIP devices supported by the call control engine 202 and the corresponding PaaS implementation, can be routed using a XML derivative language and the call processing engine 212.

According to particular embodiments, call routing logic 206 is first used to determine whether or not to route incoming calls to a receptionist. Call flow control logic 214 is then used to route calls to endpoint devices other than those of the receptionist. Call control logic can route calls whether the receptionist is bypassed by call routing logic 206 or the call has been forwarded by the receptionist after first receiving the call.

As a particular example, a business can offer virtual office spaces to many different entities. The virtual office services can include conference spaces and temporary work space. The virtual office services can include a receptionist that handles calls for the different entities. The business may have many different building locations for the conference spaces and temporary work space (e.g., distributed throughout the country or world). There can be a variety of different options for routing calls to receptionists. For example, each building location could have a dedicated receptionist. The call routing logic 206 would therefore be configured to route calls based upon associations between the called number, the entity or account associated with the called number, a particular building location, and the receptionist assigned to the building. As another example, a single receptionist could provide services for multiple building locations. The call routing logic 206 would include appropriate associations for this option. Another possibility is the use of a pool of available receptionists that are each assigned to provide answering services for the same set of entities. The call routing logic 206 can include rules for selecting a receptionist from the pool (e.g., based upon the current availability of each of the receptionists). Combinations of these options (and potentially other options) are also possible.

According to certain embodiments, the call routing logic 206 can include rules that a specific to each building location. For example, building locations may have different hours during which they are open and therefore supported by a receptionist (e.g., based upon differences in time zones). The call routing logic 206 can be configured to route calls to a receptionist when the building corresponding to the called number is open for business. When the building is closed, the call routing logic 206 does not route the call to the receptionist. Control logic 214 can then route the call to the appropriate endpoint device. Control logic 214 might also route the call to voicemail, or otherwise handle the call according to the settings for the particular account associated with the dialed number.

According to various embodiments, the call routing logic 206 can be configured to make call routing decisions based upon a specific schedule for each building or receptionist. For example, the schedule can include a period of time for lunch as well as indicating holidays during which no receptionist is available. In some instances, the call routing logic 206 can retrieve real time (or near real time) data about the availability of a particular receptionist. For example, the call routing logic 206 can query a server that provides status for the receptionist. The server can be linked to an application that the receptionist uses to change their status. The receptionist may, for example, change their status to "away from desk" or "busy" when they leave their desk for any reason. The call routing logic 206 receives the query results and can adjust the call routing accordingly. In the example where the status is "away from desk" the call routing logic 206 might place the individual on hold after playing an appropriate greeting and notification message. The call routing logic 206 might also forward calls directly for handling by the control logic 214. Other routing options, of varying complexity, are also possible.

In certain embodiments, the call routing logic 206 can include exceptions that are based upon the called number. For example, one or more entities may desire to always bypass the receptionist. Other entities might want to bypass the receptionists only if certain criteria are met. One manner in which the exceptions can be configured is by having the call routing logic query a database or server to identify called numbers that are subject to one or more exceptions. If the query indicates an exception exists for the called number, the call can be sent for handling by the control logic 214. The control logic 214 might include further logic for determining whether or not to use a receptionist. For example, the control logic 214 could be linked to calendar or other status indicator for the called entity. If the control logic 214 determines that the called party is unlikely to answer, the control logic 214 can pass control of the call routing back to the call routing logic 206. The call routing logic 206 can determine that the call has been rerouted back from the control logic 214 and route the call to the receptionist in response.

The use of multiple layers of routing logic 206, 214 can be useful for reducing the overhead in supporting a large amount of telephone numbers and endpoint devices. For instance, modifications to the call routing logic can be made in a central XML derivative document and then be immediately applied for all accounts and endpoints. Further, new endpoints can be dynamically added and removed without having to modify the higher-level XML derivative rules. For instance, the endpoints, accounts, and telephone numbers can be stored in a database that is referenced by the first XML derivative documents when making routing decisions. The database can be managed independently from the call routing logic and the call control logic.

Certain embodiments are directed toward similar functionality within a single, flat logical (XML derivative) layer. For instance, the reception routing logic and routing for each account or endpoint device can be within the same XML derivative document or set of documents. For example, each document can include call routing rules for a respective business extension with business hour schedule such as Mon-Friday 8:00 am-5:30 μm. The rules might specify that all the calls from external numbers are routed to the receptionist during these hours. Once a call is answered, the receptionist may transfer the call a particular endpoint device by selecting an extension number. To differentiate between calls that have already been routed through the receptionist, a call routing rule can be created that identifies calls originated from the receptionist. Calls identified in this manner can be routed directly to the indicated extension (e.g., to avoid being continuously redirected back to the receptionist).

According to various embodiments, the receptionist may have switchboard display that shows information about an incoming call and allows for the call to be answered by selecting an option on the switchboard display. In certain embodiments, the switchboard display is viewable within an Internet web browser application. The call control engine(s) can provide data for display via the switchboard as well as receive information for handling and routing calls.

Figure 3:
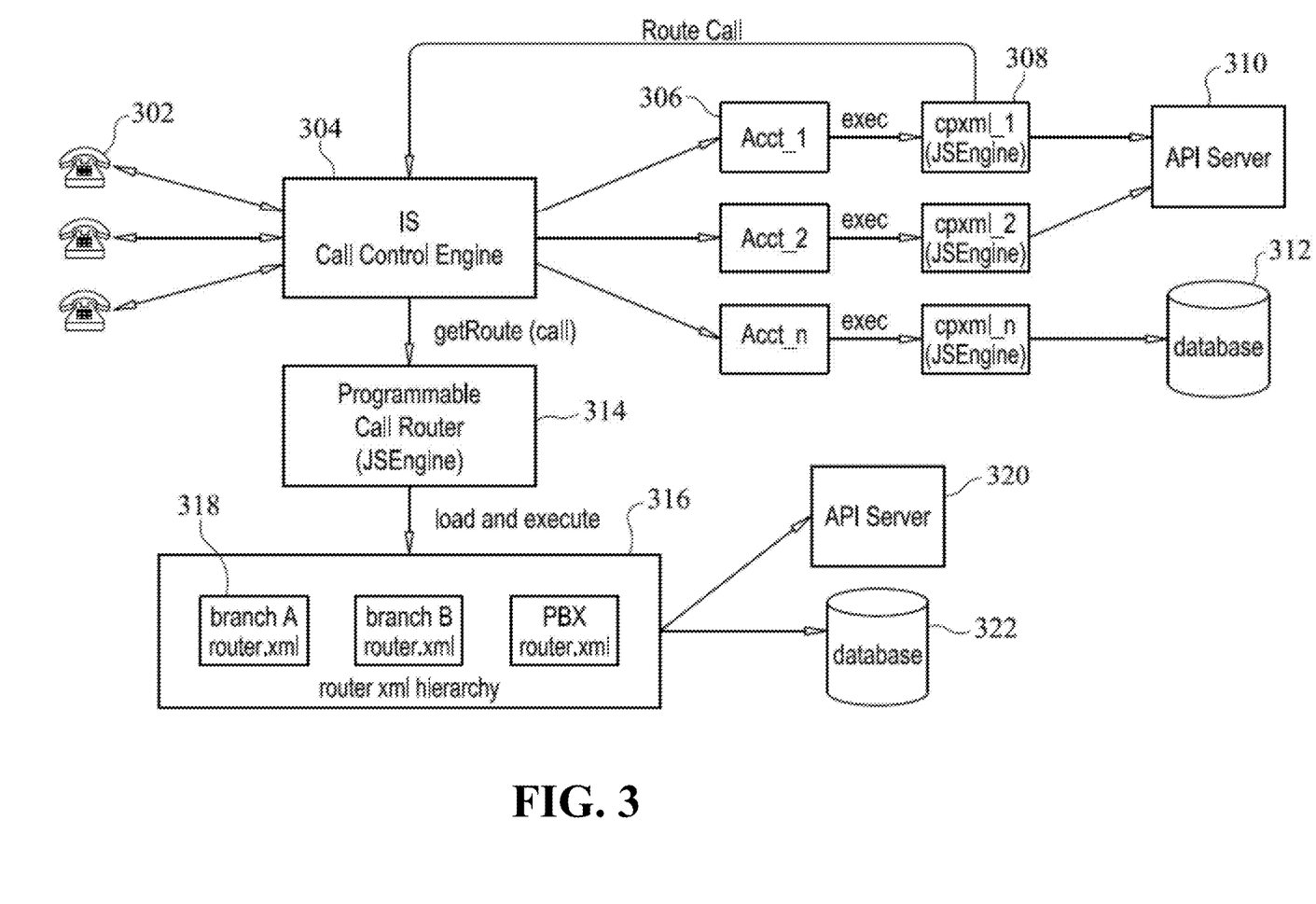
FIG. 3 is a block diagram showing the use of a hierarchy of programmable language documents, consistent with embodiments of the present disclosure.

FIG. 3 is a block diagram showing the use of a hierarchy of programmable language documents, consistent with embodiments of the present disclosure. Call control engine 304 can provide call flow control and routing in a manner that can be consistent with discussions found herein and relating to call control engines, VOIP servers, and the other figures. Consistent with various embodiments, the call control engine 304 is an IP PBX that is part of a VoIP PaaS. The IP PBX can be hosted by a VoIP service provider and located at one or more data centers. Various IP PBX features can be provided for clients and endpoint devices 302, such as call forwarding, remote pickup, call routing, and voice mail. For instance, the IP PBX can be configured using Java-based applications that manage voice over IP (VOIP) networks.

Consistent with various embodiments, customers of a VoIP provider can use the VOIP PaaS by generating documents written in two different XML languages: a first XML derivative language and a second XML derivative language. Together, the documents specify call interception rules for how the customer would prefer call intercept to be handled for both inbound and outbound calls. For instance, a second XML derivative document 308 can be associated with an extension account 306, or with groups of extension accounts. The extension accounts 306 can represent a specific individual and their associated extension number(s). An XML derivative document 308 that is configured in this manner will be invoked by the call control engine 304 after an incoming call is routed to an extension that has XML derivative capabilities enabled. XML derivative documents can also be used for call flow processing of outbound calls. In addition to telephone calls, other forms of messages (e.g. text messages and email messages) can be automatically generated in response to outgoing calls using commands included in the second XML derivative document. Restrictions can be placed on outbound calls based upon factors such as time of day or call history. Another XML derivative function could be implementation of auto/call attendants that are each specific to the XML derivative-specified routing decision.

The call control engine 304 may also consult with call routers 314. The call routers can be programmed using first XML derivative documents 318, and with JavaScript for dynamic data access and logic handling. The first XML derivative documents 318 can be arranged in router xml hierarchy 316, which can specify different XML derivative documents 318 depending upon the branch or IP PBX that is identified as corresponding to the call. Once the call router documents are loaded, they can be cached in memory and used by the call control engine 304 to make a routing decision. When a call is routed through the call control engine 304, the call control engine can consult with first XML derivative documents. The branch level can be identified, for example, based on the branch ID of caller (for outbound calls) or callee (for inbound calls). Delineations other than the branch are also possible, such as by the called country, the particular store, the state, or other factors. If a route result is not determined, the call control engine 304 can also consult with PBX-level first XML derivative document to obtain routing decisions. Examples of a route result from a script are "Accept," "Reject," or "NewRoute." Using the first XML derivative language, the programmable call router module 314 provides the call control engine 304 with the ability to handle call intercept/filter reject or re-route the call to a different target destination.

A particular example of uses for the first XML derivative documents is to provide initial routing decisions relative to a receptionist. A first XML derivative document can specify whether incoming calls are first routed to a receptionist. A few examples of how the first XML derivative rules and logic can be configured are discussed in more detail herein. If the call control engine 304 determines that call is not to be first sent to a receptionist (or the call is being forward from the receptionist), the call control engine 304 can pass call routing control over to the logic defined by the appropriate XML derivative document 308.

The call router module 314 can also be configured by a second XML derivative document to handle sophisticated call flow scenarios where the call routing is changed after the initial determination. For example, the second XML derivative can include commands (e.g., "Reroute") that the call control engine 304 uses to provide feedback to the programmable call routers 314, which use the first XML derivative for initial routing decisions. This might allow, as an example, a first XML derivative routing decision to be overridden by the second XML derivative document(s).

According to particular embodiments, the programmable call routers (using XML derivative language) 314 can be viewed as plugins to the call control engine 304. The call router plugins may have two levels, Branch and PBX levels. The call router supports XML derivative-defined structures that specify how the PaaS can be utilized by a customer. For example, the XML derivative language can define sets of conditional statements, data access requests, and call routing commands: if/else, condition, goto, log, var, script, query, data, accept, reject, route statements, or other commands. In particular embodiments, the first XML derivative language can be considered a subset of the second XML derivative language by containing a part, but not all, of the second XML derivative language call flow commands. This distinction can be useful for keeping the first XML derivative documents light weight so that call routing decisions are simplified and efficient. More complex tasks, such as the use of media and advanced call handling, can be handled using a second XML derivative language and the larger set of commands. Using such programmable call routes, a few example uses include: school district that generates short message service (SMS) or email notifications to parents whenever an emergency number is dialed; off hour restriction of outbound call with the second XML derivative language; call center lockdown to provide outbound dialing restriction for phones; computer initiated dialing with caller identification (ID) override based destination database table, and call return to target DID/agents; and implementation of a call black list (denying calls to/from the list) or white list (allowing calls to/from the list) with potentially large lists and dynamic updating capabilities.

Consistent with embodiments of the present disclosure, both the first XML derivative language and the second XML derivative language provide the capability of handling dynamic data from multiple sources. Examples of these sources can include PBX internal state such as call session object with caller, callee, routes, and last redirect address information, remote services (e.g., application program interface servers) and databases 312, 322. The dynamic data can therefore be provided from a variety of sources including, but not necessarily limited to, call route session data (caller id, callee id, or route from/to), query custom object (to a database) in the VoIP provider system/cloud, and access data through HTTP RESTful API (e.g., from API servers 310, 320). For instance, the XML documents can include a web resource that is identified by URIs. The web resource might be a customer HTTP server that responds to a conditional query (e.g., whether or not a call queue is above a threshold) with XML derivative code that instructs the call control engine on how to route, or otherwise handle, the call.

Figure 4:
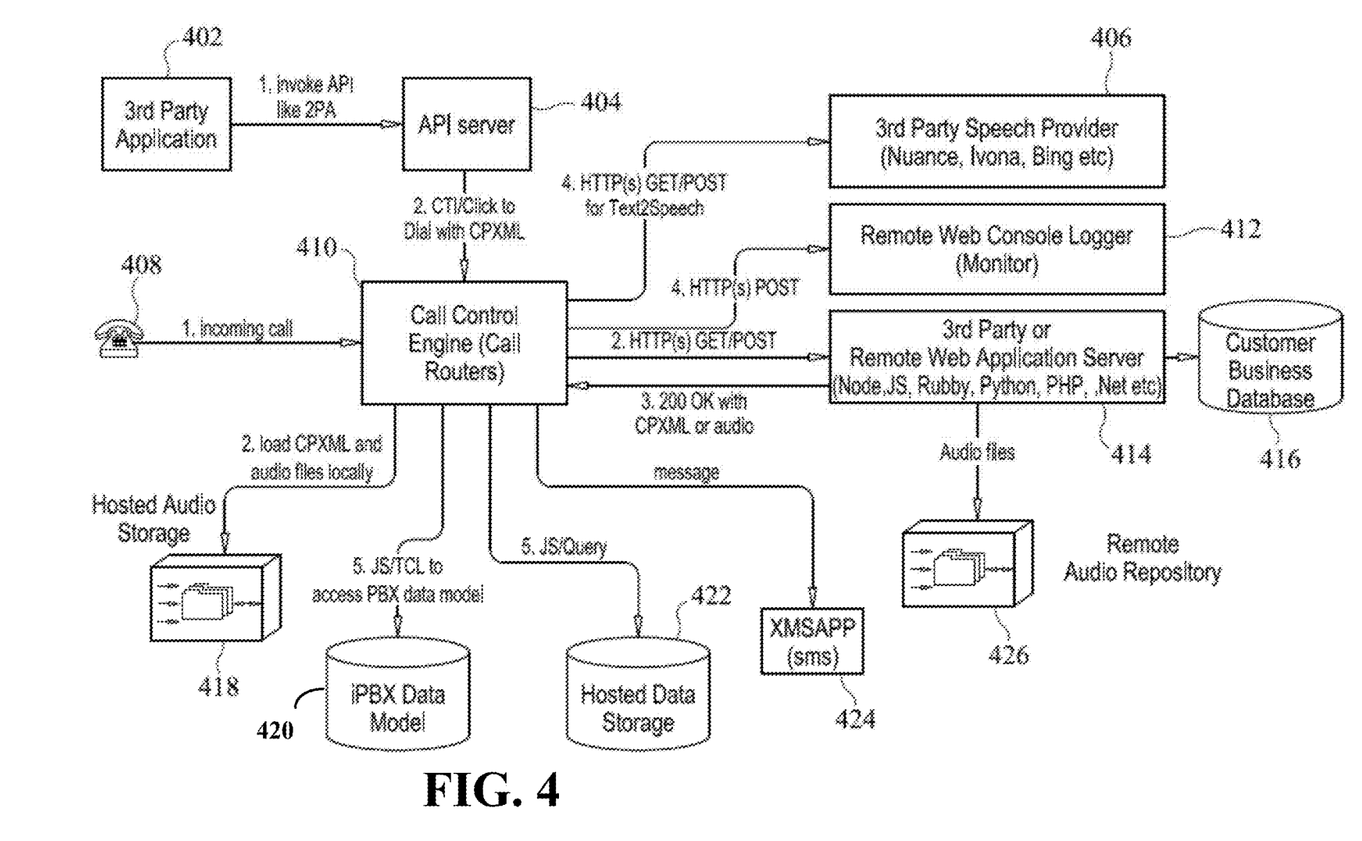
FIG. 4 is a block diagram showing interconnections to a call routing switch, consistent with embodiments of the present disclosure.

FIG. 4 is a block diagram showing interconnections to a call routing switch, consistent with embodiments of the present disclosure. As another particular non-limiting example, an incoming call is received from a telephone device 408 by the call control engine 410. The call control engine 410 can use the call destination information carried by the call to invoke a proper VoIP call services action (e.g., CTI or a click to dial functionality), which in some instances can be provided by a third party application server 402 using a VoIP provider's API server 404. The XML derivative documents can be embedded within the click-to-dial request or CTI service data.

As a particular example, a third party application can use an API provided by API server 404 to contact an authorization server for the purpose of obtaining authorization to use certain servers or functions of the system. The authorization procedure can include for example (without imposing limitations) the use of access tokens generated consistent with the authorization protocol. The API server 404 can also provide API functions that allow the third party application to embed XML derivative documents into call control requests. For example, the second XML derivative documents could be embedded in an HTTP request using a text-to-binary format, such as the Base64 format. The second XML derivative documents can include commands that rely upon the use of a variety of different functions offered by the system. This might include a text-to-speech application 406 or the playing of audio files 418 or 426. The second XML derivative documents might also include queries for information stored in databases 422 or 416.

In another non-limiting example, the API provided by API server 404 may make call routing decisions based on defined call options for particular applications. For instance, the API might include an option to perform an action such as play a recorded message to a particular destination using the call control engine 410. In another example, the API might include an option to block a caller identification function on email notifications. In such instances, when a call is received and forwarded to voicemail, the API may set the caller identification to 'anonymous' and the email notification and file name would thereafter include 'anonymous' in the place of a caller name. The API might also include an option to perform an action, such as play a welcome message under defined circumstances. Yet further, the API might include an option to request the recipient of a call to enter a particular dual-tone multi-frequency (DTMF) signal (such as the number '1') to answer an incoming call.

The API server 404 can also provide API-defined functions that interact with the second XML derivative language documents in a defined manner. For instance, an API provided by API server 404 might direct the call control engine to call a destination, and then connect to an extension account with a pre-defined XML derivative document. In such examples, the call control engine might pass call options and application data (e.g., customer data) to the XML engine. For example, an appointment reminder option may be defined in the API and performed by the call control engine, where appointment information in a calendar extension account may be routed to a particular destination with instructions to play in voice or SMS/XMS format. Details regarding the appointment may be retrieved from the extension account using the XML derivative document, such as a location, date, time, and notes regarding the appointment.

In some examples, a XML derivative document may itself invoke an API provided by the API server 404. For instance, a second XML derivative document may be used to create a message recording service, obtain an access token from an authentication server, send a HTTP request to the call control engine to route a call to a particular destination and play the recorded message. In such an example, a user may dial into an extension account with the second XML derivative document, record the message to be sent, then end the call. The second XML derivative document may identify the end of the call and execute logic which will initiate the HTTP request to invoke an API to play the recorded message to a particular destination number.

Such directives (e.g., provided by such XML derivative documents) can also be loaded from a database 422, which might be hosted by the VOIP provider as part of the PaaS solution. XML derivative documents can also be retrieved from a customer database 416. For example, the XML derivative documents could be retrieved using an HTTP connection to a web application server 414. At the same time that the document derivatives are retrieved, additional information can also be provided, such as audio files 418, 426. The audio files could be used for various purposes, such as for implementing auto attendant functions.

In various embodiments, a customer can use databases and other data sources that are offered by the VoIP provider without having direct access to the data. For instance, the customer can use the second XML derivative language to generate queries that identify a data source and a conditional response based upon the query results. The call control engine can carry out the conditional response based upon the results of the query without the customer ever receiving, or otherwise having access to, the data driving the conditional response. A particular example involves a query to a call analytics database for the VoIP provider. A customer could be given the limited, indirect access to the database through XML derivative-driven queries, while the VoIP services provider maintains control over the proprietary contents of the database. The database might also contain information about individual callers that would raise privacy concerns in which cases the VoIP services provider can use another set of rules for deciding whether and how to use/share such privacy information. As an example, one set of privacy rules may ensue from law of one or more particular governing agencies, requiring that such information be first encrypted before being transferred or stored to a readable/accessible platform. In this manner the document directives are retrieved with such additional information for decisions to be made based on another set of rules.

In some instances, the customer can allow the VoIP provider to indirectly access data sources in response to XML derivative-driven queries. For example, the customer can specify, in a second XML derivative document, a URI that points to a customer-provided server and specifies an associated query. The customer-provided server can execute, for example, a local script that may rely upon customer data. The script can generate a response in the form of a second XML derivative document. The call control engine can then carry out call routing, or other call control functions, based upon the response and without ever having direct access to the customer data.

In certain embodiments, the call control engine 410 can provide call processing information to a monitor server 412 (e.g., a remote web consolelogger application). The call control engine 410 can then execute the second XML derivative documents. In an example implementation, the second XML derivative document might invoke various other services, such as a text-to-speech application 406. For example, a second XML derivative document might specify that a string of text be converted to speech using a corresponding command (e.g., "<say>Hello, please hold. </say>"). The second XML derivative document can also request access to various other data sources, such as IP PBX data model 420 and a hosted data storage 422. Further, the second XML derivative document can specify that an SMS/MMS (XMS) text message be sent using XMSApp 424 or generate new calls (e.g., for call conferencing or call forking). The provided examples of capabilities using XML derivative documents are not limiting.

Figure 5:
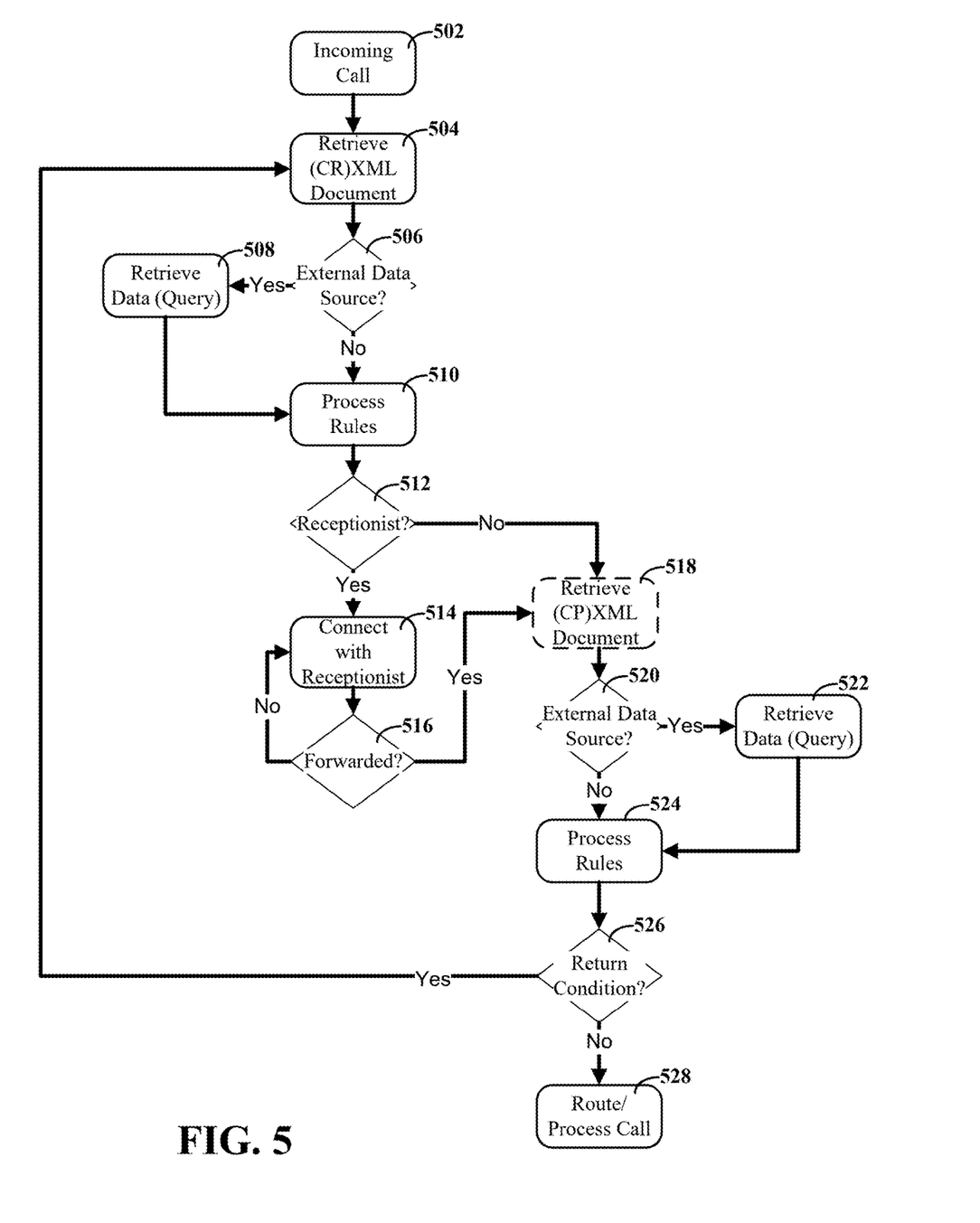
FIG. 5 is a flow diagram for controlling call routing to a receptionist, consistent with embodiments of the present disclosure.

FIG. 5 is a flow diagram for controlling call routing to a receptionist, consistent with embodiments of the present disclosure. The flow begins with an incoming call, per block 502. The incoming call information provides data about the number called and may also include information about the calling number (e.g., Caller ID). The called number may correspond to one of multiple accounts that are supported by a receptionist (or by several receptionists), for example, operating on behalf of a client entity subscribing to a set of VOIP telecommunications services. In response to receipt of the call, a call control engine (e.g., 410 of FIG. 4 at the services provider side of the interface) can access the appropriate call routing and call processing rules per block 504. As discussed herein, the rules can be provided from the subscribing client entity in the form of an XML-type document for receipt and interpretation by the call control engine for following the above-noted call routing and call processing rules in connection with block 504.

In particular embodiments, there can also be multiple levels of call processing rules and optionally with multiple XML-type languages or different sets of instruction sets used in connection with the different respective levels. As a specific example, the call control engine can use a first (e.g., light-weight) XML derivative document that functions as a plugin module to the call control engine. Subsequent call processing rule levels can use documents written with more complex language(s) that can use a superset of commands relative to the first level (e.g., documents that use the second XML derivative).

Consistent with certain embodiments, the call control engine can rely upon external data source(s), per block 506. As discussed herein, several different manners may be used so that data can be efficiently retrieved from the external data sources, per block 508. For example, XML-type documents themselves can be retrieved from an external source. For example, the call control engine might operate by sending requests to a web server and get XML-type documents for processing. The call control engine can interpret a received XML-type document to identify (XML) language building blocks that are then rendered (executed). Each building block can define logic relating to one or more functions, such as functions for voice, call control, and flow control logic. The requests can include relevant information about the incoming call, such as the called number and the caller ID. The XML-type document may define query requests that the call control engine generates in order to retrieve data from databases or other sources of data. A query could be formatted for consistency with the source of the data (e.g., JSON) to retrieve data from third party application servers or from the VoIP server provider's cloud database).

The call control engine processes the rules defined by the XML rules along with any retrieved data, per block 510. One result of the processing can be a determination of whether or not to route the call to a receptionist, per block 512. Upon connection with a receptionist, per block 514, the call can remain connected until the receptionist choses to forward the call to the called party (or to another party), per block 516.

According to some embodiments, calls that either have not been intercepted (e.g., bypassed the receptionist) or have been forwarded by the receptionist, can be processed according to another set of XML documents, per block 518. In particular implementations, the documents retrieved per block 518 can be written using a language that has an instruction set that is a superset of the instruction set for the language used by the document retrieved per block 504 (e.g., a second XML derivative language being a superset of the first XML derivative language). The increased size of the instruction set can facilitate more complex call processing and routing operations to be defined. For example, the first XML derivative language can be used primarily for determining initial routing decisions for all incoming calls. This routing decision can be made by a call control engine located at a call routing switch that can route the incoming call to any of a plurality of IP PBXs. Each IP PBX can have a corresponding call control engine and second XML derivative document(s). The second XML derivative documents might invoke more complex call processing operations, such as triggering computer telephony integration (CTI) modules used by the called party or playing audio that is appropriate for the particular call (e.g., audio that is selected based upon factors indicated by the second XML derivative document).

Consistent with certain embodiments, the call control engine(s) can rely upon external data source(s), per blocks 520 and 522. As discussed in connection with blocks 506 and 508 (and in other discussions herein), there are several different manners by which data can be retrieved from the external data sources, per block 522. The call control engine(s) processes the rules defined by the XML rules along with any retrieved data, per block 524. Based upon the rules, the call can be routed and processed, per block 528.

In some embodiments, the call can still be routed back to a receptionist, or rerouted to a different IP PBX. In particular, the second XML derivative document could indicate that the call be processed again by the first call control engine as noted by the connection between blocks 526 and 504. The call control engine of the IP PBX can provide information that adjusts how the call is routed during this second pass through the first call control engine (e.g., thereby avoiding a loop condition). For instance, a general call interception rule for a location may bypass the receptionist for all calls at a particular time of day. A particular call would then be sent to an IP PBX that corresponds to the account of the dialed party. The second XML derivative document for the corresponding account might include conditions that route the call back to a receptionist. For instance, the second XML derivative document could check the online status of the called party relative to an application running on their computer. In particular, the second XML derivative document might be directed to an API that provides the online status. The conditional routing could specify that if the individual is in currently in a meeting the call should be routed back to the first call control engine with instructions to route the call to an alternative party or to a receptionist.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in some of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processor circuit and memory circuit that are configured to provide services to other circuit-based devices. Moreover, a (VOIP) endpoint device (or endpoint) includes a communication circuit (e.g., transceiver circuits for send and receiving audio or other data) and (computer) processor circuits which are configured to establish (VOIP) communication sessions with other endpoint devices (e.g., personal computers, IP-enabled mobile phones, and tablet computers). In certain embodiments, such a processor circuit is one or more computer processor circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A system comprising:
 circuitry, comprising one or more data-communications servers and computing processor circuitry, to
  provide data-communication services, comprising controlling handling of data-communication calls that involve first and second sets of one or more endpoint devices respectively associated with first and second subscribers by executing a first set of instructions in a first document written in a first XML computer-programming language, wherein execution of the first set of instructions in the first document identifies a second document; and
  access and interpret, in response to identifying the second document, a second set of instructions in the second document written in a second XML computer-programming language that is a derivative of the first XML computer-programming language, which is provided independent of the data-communication calls and on behalf of and is specific to a second subscriber and, in response, control handling of certain of the data-communication calls involving the second set of one or more endpoint devices as indicated by the second set of instructions in the second document.

2. The system of claim 1, wherein the circuitry is to receive the second set of instructions via an application program interface which is to direct the circuitry to a link which embeds at least a portion of the second set of instructions, and wherein each of the first and second sets of one or more endpoint devices comprises a user-operable communications-enabled circuit.

3. The system of claim 1, wherein the second set of instructions are received via an interface operated on behalf of the second subscriber.

4. The system of claim 1, wherein the second set of instructions are received on behalf of the second subscriber via an interface that allows the circuitry to adjust a manner in which the data-communication services are provided for the second set of one or more endpoint devices associated with the second subscriber.

5. The system of claim 1, wherein the second set of instructions are received on behalf of the second subscriber to allow the circuitry to adjust, via a secure protocol, a manner in which the data-communication services are provided for the second set of one or more endpoint devices.

6. The system of claim 1, wherein the second set of instructions are received on behalf of the second subscriber via a secure link or server, to allow the circuitry to adjust, via a secure protocol, a manner in which the data-communication services are provided for the second set of one or more endpoint devices.

7. The system of claim 1, wherein the second set of instructions are received on behalf of the second subscriber via a secure link or server, which is the circuitry uses to isolate, by providing a layer of secure access control over, certain information specific to at least one of the first and second subscribers.

8. The system of claim 1, wherein the second set of instructions are received using or in a code that describes building blocks to be used in a particular application for certain of the data-communication services specific to the second subscriber.

9. The system of claim 1, wherein the second set of instructions are to instruct on how to route data communication calls processed via a call center operated on behalf of one of the first and second subscribers.

10. The system of claim 1, wherein the first set of instructions are to instruct on how to identify the second set of instructions, and the first XML computer-programming language and the second XML computer-programming language differ in terms of calling out directives to be carried out by a telecommunications provider of the data-communication services.

11. The system of claim 1, wherein said one or more data-communications servers refers to or comprises separate servers configured to collectively function as a single unified server, and the second set of instructions are to be obtained from a customer-provided resource by one or more of: a URI link, a customer server, a direct load from a customer database, and dynamic generation based upon data that is specific to a particular call being processed by the one or more data-communications servers.

12. For use in a system comprising one or more data-communications servers and computing processor circuitry and comprising a first set of instructions in a first document written in a first XML computer programming language which are executed to provide data-communication services concerning data-communication calls that involve first and second sets of one or more endpoint devices respectively associated with first and second subscribers by executing the first set of instructions in the first document from the first XML computer programming language, wherein execution of the first set of instructions in the first document identifies a second document, and a storage device having computer-readable instructions which, in response to being retrieved and interpreted by the one or more data-communications servers and the computing processor circuitry, cause a set of one or more steps to be carried out, the set of one or more steps comprising:

access and interpret, in response to identifying the second document, a second set of instructions in the second document written in a second XML computer programming language with a subset of instructions from the first set of instructions in the first document, which is provided independent of data-communication calls involving the first subscriber and which is conveyed on behalf of and is specific to a subscriber that is associated with the second set of one or more endpoint devices and, in response, controlling handling of certain of the data-communication calls involving the second set of one or more endpoint devices as indicated by the second set of instructions in the second document.

13. The storage device of claim 12, wherein the set of one or more steps further comprises parsing the second set of instructions for controlling handling of certain of the data-communication calls involving the second set of one or more endpoint devices as indicated by the second set of instructions.

14. The storage device of claim 12, wherein the set of one or more steps further comprises receiving the second set of instructions via call routing control logic circuitry and then parsing the second set of instructions, via the call routing control logic circuitry.

15. A method for use in a system, comprising one or more data-communications servers and computing processor circuitry, the method comprising:

providing data-communication services that concern first and second sets of one or more endpoint devices respectively associated with first and second subscribers by executing a first set of instructions in a first document in a first programming language, wherein execution of the first set of instructions in the first document identifies a second document; and accessing and interpreting, in response to identifying the second document, a second set of instructions in the second document which is provided independent of data-communication calls involving the first subscriber and which is provided on behalf of and specific to a subscriber that is associated with the second set of one or more endpoint devices and, in response, controlling handling of data-communication calls involving the second set of one or more endpoint devices as indicated by the second set of instructions in the second document, wherein the second set of instructions are in a form of an XML computer language and are received via an interface operated on behalf of the second subscriber.

16. The method of claim 15, wherein the second set of instructions is to instruct on how to make telephone calls requested by the second set of one or more endpoint devices.

17. The method of claim 15, wherein the second set of instructions is to instruct on how to route data communication calls incoming to a call center.

18. The method of claim 15, wherein the second set of instructions is to provide time-of-day routing rules, which inform the computing processor circuitry concerning routing decision involving the second set of one or more endpoint devices.

19. The method of claim 15, wherein the second set of instructions is to provide a request to establish communications with an individual through a telephone call or a text message.

* * * * *